(12) United States Patent
Bai et al.

(10) Patent No.: US 9,626,050 B2
(45) Date of Patent: Apr. 18, 2017

(54) TOUCH PANEL AND TOUCH-SENSITIVE DISPLAY DEVICE

(71) Applicant: Shenzhen China Star Optoelectronics Technology Co., Ltd., Shenzhen, Guangdong (CN)

(72) Inventors: Yujie Bai, Guangdong (CN); Jinjie Zhou, Guangdong (CN); Xingling Guo, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 108 days.

(21) Appl. No.: 14/425,616

(22) PCT Filed: Dec. 8, 2014

(86) PCT No.: PCT/CN2014/093268
§ 371 (c)(1),
(2) Date: Mar. 3, 2015

(87) PCT Pub. No.: WO2016/082244
PCT Pub. Date: Jun. 2, 2016

(65) Prior Publication Data
US 2016/0147330 A1    May 26, 2016

(30) Foreign Application Priority Data
Nov. 26, 2014  (CN) .......................... 2014 1 0693340

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01)

(58) Field of Classification Search
CPC ......... G06F 3/044; G06F 3/045; G06F 3/0412
See application file for complete search history.

(56) References Cited

U.S. PATENT DOCUMENTS

| | | | | |
|---|---|---|---|---|
| 2011/0279400 A1* | 11/2011 | Yilmaz | ................... | G06F 3/044 345/174 |
| 2011/0304582 A1* | 12/2011 | Ho | .......................... | G06F 3/044 345/174 |
| 2012/0146941 A1* | 6/2012 | Shin | ........................ | G06F 3/044 345/174 |

(Continued)

*Primary Examiner* — Carolyn R Edwards
*Assistant Examiner* — Scott Au
(74) *Attorney, Agent, or Firm* — Andrew C. Cheng

(57) ABSTRACT

A touch panel and a touch-sensitive display device are provided. The touch panel includes transversal electrode arrays and longitudinal electrode arrays with mutually perpendicular extending directions. The transversal electrode arrays and the longitudinal electrode arrays are each connected to a controller by a wire. All the wires are each serially connected with a first resistor. A sum of an owned resistance of each wire and a resistance of the first resistor serially connected with the wire constitutes an equivalent resistance, and all the equivalent resistances respectively corresponding to all the wires are equal. By the above solution, the invention can avoid the problem of inaccurate detection caused by error resulting from different wire resistances, and the detection accuracy of the touch panel is effectively improved consequently.

13 Claims, 4 Drawing Sheets

(56) References Cited

U.S. PATENT DOCUMENTS

2014/0054145 A1* 2/2014 Chi ................. G06F 3/03547
200/304
2015/0309651 A1* 10/2015 Papakostas ........... G06F 3/0414
345/174

* cited by examiner

TOUCH PANEL AND TOUCH-SENSITIVE DISPLAY DEVICE

TECHNICAL FIELD

The invention relates to the field of display technology, and particularly to a touch panel and a touch-sensitive display device.

DESCRIPTION OF RELATED ART

A touch screen, also known as touch panel, generally is a sensing-type liquid crystal display device which can receive an input signal triggered by a touch object such as finger. When a graphic button on a screen is touched, a haptic feedback system on the screen can determine a position of the touch operation based on a preset driving scan mode, and further determine the clicked graphic button as well as the type of instruction. Compared with the traditional mechanical button panel, the touch screen is more convenient and therefore has been widely used.

There are many commonly used touch screens such as vector pressure sensor touch screen, infrared touch screen, surface acoustic wave touch screen and resistive touch screen, and the most commonly used touch screen in the art is a capacitive touch screen.

The capacitive touch technology is a touch technology using a capacitance change generated when a finger approaches a capacitive touch panel and includes a self-capacitance touch technology and a mutual-capacitance touch technology. In particular, transversal electrode arrays and longitudinal electrode arrays made of a transparent conductive material are formed on a glass surface, the transversal and longitudinal electrodes each constitute a capacitance (screen capacitance) together with the ground and such capacitance is commonly referred to as self-capacitance. When a finger touches the touch screen, a capacitance caused by the finger will add onto the screen capacitance, so that the screen capacitance is increased. The self-capacitance touch screen sequentially detects the transversal and longitudinal electrode arrays and determines a transversal coordinate and a longitudinal coordinate based on a change of capacitance between before and after being touched, and finally constitutes a planar touch coordinates, as shown in FIG. 1. The foregoing is a working manner of the self-capacitance touch screen. The mutual-capacitance touch screen also is formed with transversal electrodes and longitudinal electrodes on a glass surface, and a difference from the self-capacitance touch screen is that: the screen capacitance is formed at each of intersections of the transversal electrodes with the longitudinal electrodes, i.e., the two group of electrodes respectively are used as two electrodes of respective screen capacitances. When a finger touches the mutual-capacitance touch screen, because the human body also is a conductor and thus will form a capacitance together with the touch screen, and the formed capacitance will affect the coupling between two electrodes near a touched point and change the mutual-capacitance between the two electrodes. When detecting the magnitudes of the mutual-capacitances, the transversal electrodes are provided an excitation signal and all the longitudinal electrodes meanwhile receive signals, the magnitudes of the capacitances at the intersections of all the transversal and longitudinal electrodes can be obtained, and finally coordinates of the touched point can be determined based on obtained two-dimensional capacitance change data of the touch screen.

Either the self-capacitance touch screen or the mutual-capacitance touch screen, the process of applying voltages on transversal or longitudinal electrodes and scanning is a process of charging self-capacitances or mutual-capacitances, since the capacitance at the touched point has changed and thus is different from other capacitances, therefore the position of the touched point generally is determined based on charging times of charging all the capacitances to a fixed voltage value.

However, because distances from respective transversal electrode arrays or longitudinal electrode arrays to a controller are not equal, lengths of wires respectively connecting the electrode arrays to the controller are not the same, even if the wires are made of a same material and have a same cross-sectional size, the resistance differences thereamong still are existed. Although the resistance differences are not large, because the touch screen is an extremely sophisticated equipment, even if a small difference, when the controller charges the electrode arrays, if a voltage-divided value of the wire is excessive, it will affect the magnitude of a signal voltage for capacitance charging and thus affect the time of capacitance charging. As a result, the sensing accuracy of the touch screen is affected.

SUMMARY

A technical problem primarily to be solved by the invention is to provide a touch panel and a touch-sensitive display device, which can effectively improve the detection accuracy of touch panel.

In order to solve the technical problem, a technical solution proposed by the invention is to provide a touch panel. The touch panel includes transversal electrode arrays and longitudinal electrode arrays with mutually perpendicular extending directions, and the transversal electrode arrays and the longitudinal electrode arrays being each connected to a controller by a wire. All the wires are each serially connected with a first resistor, a sum of an owned resistance of each of the wires and a resistance of the first resistor serially connected with the wire constitutes an equivalent resistance, and all the equivalent resistances respectively corresponding to all the wires are equal. The transversal electrode arrays have equal first spacings thereamong, and the longitudinal electrode arrays have equal second spacings thereamong. The transversal electrode arrays and the longitudinal electrode arrays each include at least two nanometer indium tin oxide (ITO) electrodes.

In an exemplary embodiment, the first resistor is a surface mounted device (SMD) resistor.

In an exemplary embodiment, the touch panel is a self-capacitance touch panel or a mutual-capacitance touch panel.

In order to solve the above technical problem, a technical solution proposed by the invention is to provide a touch panel. The touch panel includes transversal electrode arrays and longitudinal electrode arrays with mutually perpendicular extending directions, the transversal electrode arrays and the longitudinal electrode arrays being each connected to a controller by a wire, the wire being serially connected with a first resistor, a sum of an owned resistance of the wire and a resistance of the first resistor serially connected with the wire constituting an equivalent resistance, and all the equivalent resistances respectively corresponding to all the wires being equal.

In an exemplary embodiment, a first spacing between each neighboring ones of the transversal electrode arrays is equal to that between other neighboring ones of the transversal electrode arrays, and a second spacing between each neighboring ones of the longitudinal electrode arrays is equal to that between other neighboring ones of the longitudinal electrode arrays.

In an exemplary embodiment, the transversal electrode arrays and the longitudinal electrode arrays each include at least two nanometer indium tin oxide (ITO) electrodes.

In an exemplary embodiment, the first resistor is a surface mounted device (SMD) resistor.

In an exemplary embodiment, the touch panel is one selected from the group consisting of a self-capacitance touch panel and a mutual-capacitance touch panel.

In order to solve the above technical problem, another technical solution proposed by the invention is to provide a touch-sensitive display device. The touch-sensitive display device includes a touch panel. The touch panel includes transversal electrode arrays and longitudinal electrode arrays, an extending direction of the transversal electrode arrays and an extending direction of the longitudinal electrode arrays are mutually perpendicular to each other, the transversal electrode arrays and the longitudinal electrode arrays are each connected to a controller by a wire. All the wires are each serially connected with a first resistor, a sum of an owned resistance of each of all the wires and a resistance of the first resistor serially connected with the wire constitutes an equivalent resistance, and all the equivalent resistances respectively corresponding to all the wires are equal.

In an exemplary embodiment, first spacings among the transversal electrode arrays are equal, and second spacings among the longitudinal electrode arrays are equal.

In an exemplary embodiment, the transversal electrode arrays and the longitudinal electrode arrays each include at least two nanometer indium tin oxide (ITO) electrodes.

In an exemplary embodiment, the first resistor is a surface mounted device (SMD) resistor.

In an exemplary embodiment, the touch panel is a self-capacitance touch panel or a mutual-capacitance touch panel.

The efficacy of the invention is that: different from the prior art, the touch panel of the invention includes transversal electrode arrays and longitudinal electrode arrays with mutually perpendicular extending directions, the transversal electrode arrays and the longitudinal electrode arrays being each connected to a controller by a wire, the wire being serially connected with a first resistor, a sum of an owned resistance of the wire and a resistance of the first resistor serially connected with the wire constituting an equivalent resistance, and all the equivalent resistances respectively corresponding to all the wires being equal, so that when the touch panel has received a touch operation, the controller can accurately the touched position, the problem of inaccurate detection caused by error resulting from different wire resistances can be avoided, the detection accuracy of the touch panel is effectively improved as a result.

BRIEF DESCRIPTION OF THE DRAWINGS

In order to more clearly illustrate the technical solutions of various embodiments of the present invention, drawings will be used in the description of embodiments will be given a brief description below. Apparently, the drawings in the following description only are some embodiments of the invention, the ordinary skill in the art can obtain other drawings according to these illustrated drawings without creative effort. In the drawings.

DETAILED DESCRIPTION OF EMBODIMENTS

In the following, with reference to accompanying drawings of embodiments of the invention, technical solutions in the embodiments of the invention will be clearly and completely described. Apparently, the embodiments of the invention described below only are a part of embodiments of the invention, but not all embodiments. Based on the described embodiments of the invention, all other embodiments obtained by ordinary skill in the art without creative effort belong to the scope of protection of the invention.

Figure 1:
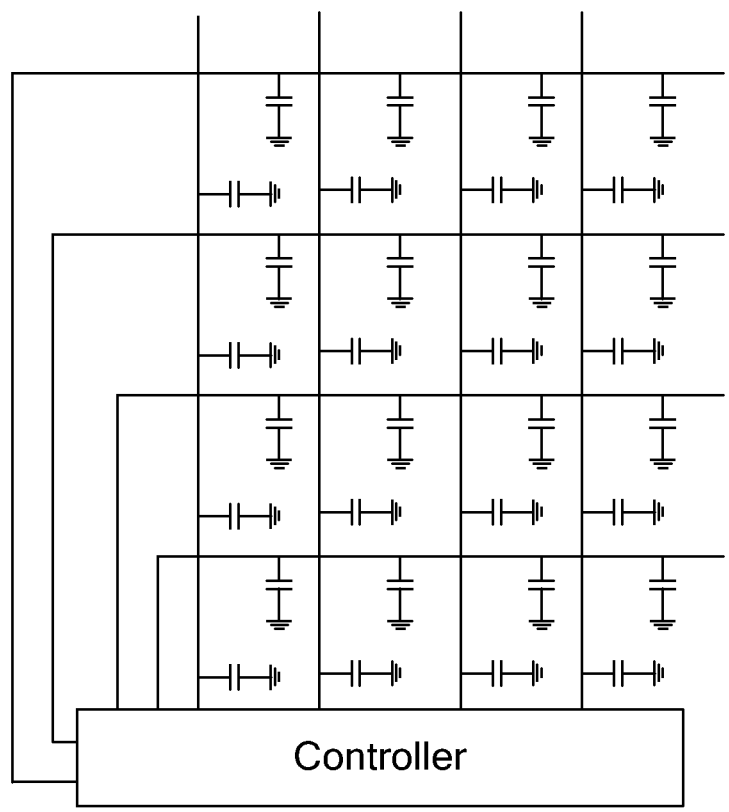
FIG. 1 is a schematic structural view of an operation principle of a self-capacitance touch screen in the related art.
Figure 2:
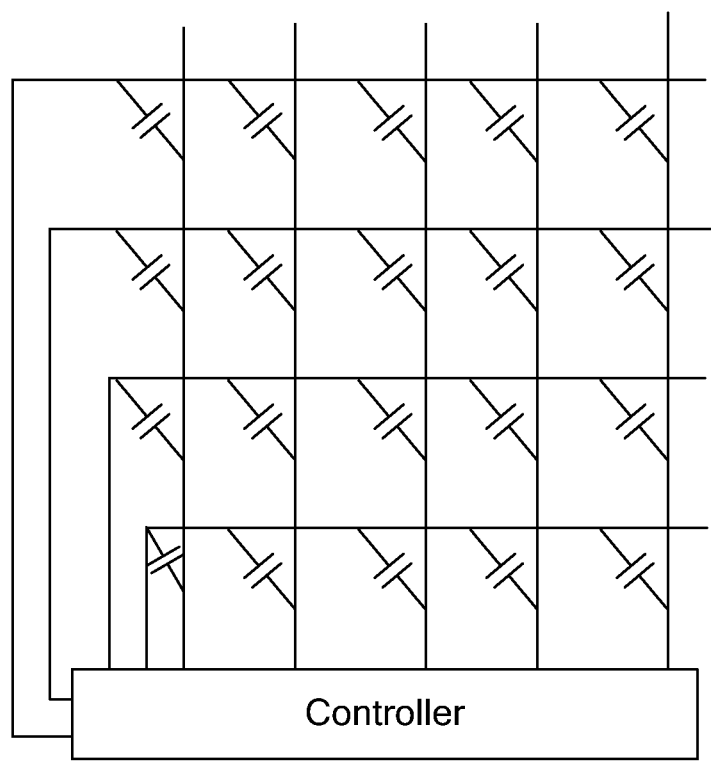
FIG. 2 is a schematic structural view of an operation principle of a mutual-capacitance touch screen in the related art.
Figure 3:
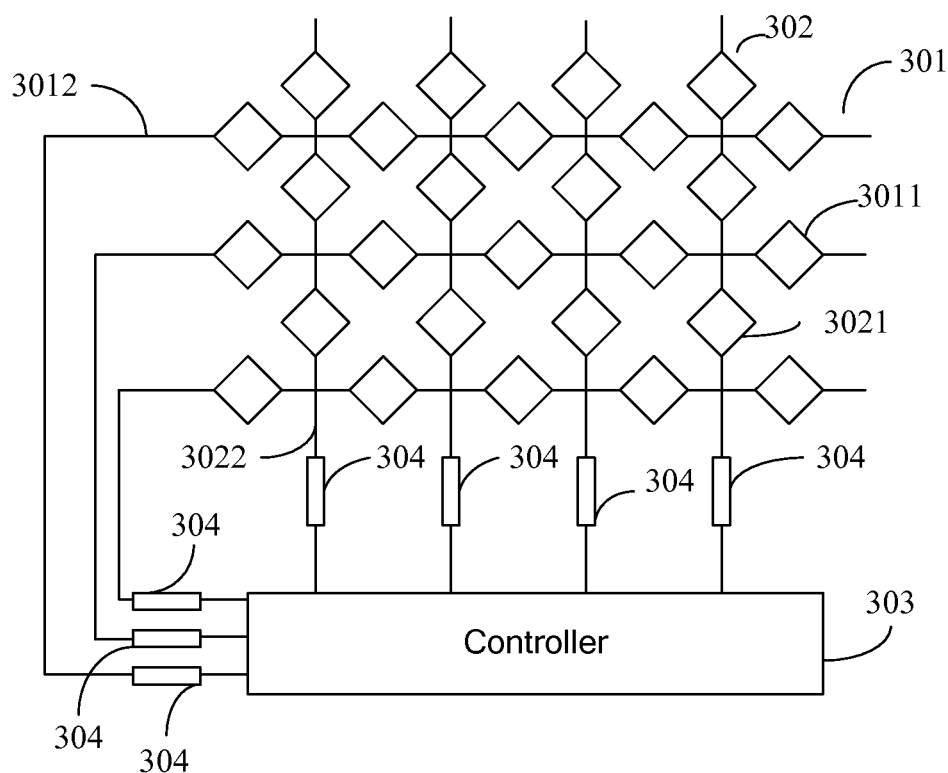
FIG. 3 is a schematic structural view of an embodiment of a touch panel of the invention.

Referring to FIG. 3, FIG. 3 is a schematic structural view of an embodiment of a touch panel of the invention. In this embodiment, the touch panel includes transversal electrode arrays 301, longitudinal electrode arrays 302 and a controller 303. An extending direction of the transversal electrode arrays 301 and an extending direction of the longitudinal electrode arrays 302 are mutually perpendicular to each other. Each of the transversal electrode arrays 301 includes at least two touch electrodes 3011, and each of the longitudinal electrode arrays 302 includes at least two touch electrodes 3021. The touch electrodes 3011, 3021 are nanometer ITO (indium tin oxide) electrodes, and in other embodiment, they may be other type of electrodes and are not limited herein. Each of the transversal electrode arrays 301 is connected to the controller 303 by one wire 3012, and each of the longitudinal electrode arrays 302 is connected to the controller 303 by one wire 3022. Moreover, as shown in FIG. 3, in order to ensure equivalent resistances of the wires 3012 and the wires 3022 respectively connecting the touch electrodes 3011 and the touch electrodes 3021 are equal to one another, all the wires 3012 and 3022 are each serially connected with a first resistor 304 corresponding to its owned resistance of the wire.

Specifically, in this embodiment, the touch panel is a capacitive touch panel which is a self-capacitance touch panel or a mutual-capacitance touch panel. An operation principle of the capacitive touch panel is that when the user touches the touch panel, it would change an existing capacitance of the capacitive touch panel, e.g., a self-capacitance formed by each touch electrode 3011 or 3021 in the self-capacitance touch panel together with the ground, or a mutual-capacitance mutually formed by each transversal touch electrode 3011 and each longitudinal touch electrode 3021 at the intersection of the transversal electrode array 301 and the longitudinal electrode array 302 in the mutual-capacitance touch panel. By detecting position coordinates of touch electrodes which have a capacitance change(s) caused by the finger's touch of user, the touch panel can determine the touched position consequently.

In this embodiment, the position of the touched point is determined by measuring times of charging all touch electrodes 3011 and 3021 to a rated voltage value, taking the self-capacitance touch panel as an example, it is assumed that a charging voltage for charging the touch electrodes 3011 and 3021 is Vin, all the capacitances are required to be charged to a rated voltage value Vout, the self-capacitances formed by respective touch electrodes with the ground each are C, the equivalent resistances of wires each are R, according to a formula Vout=Vin $(1-e^{-t/RC})$ associated with the rated voltage Vout and a charging time t of being charged to the rated voltage, it can be found that as long as the rated charging voltage Vin, the equivalent resistances R of all the wires 3012, 3022 being equal and the values C of all the capacitances being equal are ensured, corresponding times can be accurately determined and thereby the position of a touched point can be determined as a result.

In this embodiment, in order to make the equivalent resistances of all the wires 3012, 3022 to be equal, a resistance of each of the wires 3012, 3022 is firstly measured.

Specifically, according to a wire resistance calculation formula $R=(\rho L)/S$, a resistance of each of the wires 3012, 3022 can be obtained by calculation. In the formula, $\rho$ is a resistivity of the wire, L is a length of the wire and concretely is a length of the wire connecting the touch electrode 3011 or 3021 to the controller 303, and S is a cross-sectional area of the wire. In a preferred embodiment, the wires respectively connecting the transversal electrodes and longitudinal electrodes are made of a same material and have a same cross-sectional size, a resistance of each wire can be obtained directly by measuring the length of the wire, and therefore the measuring process can be simplified. In other embodiment, the wires may be made of different materials and have different cross-sectional sizes and are not limited herein, as long as the equivalent resistances being equal is ensured.

After the resistance of each wire 3012 or 3022 is obtained by measurement and calculation, equivalent resistances of all the wires 3012, 3022 are determined, and then a resistance of a first resistor 304 serially connected with each wire 3012 or 3022 can be determined based on a difference between the equivalent resistance and an owned resistance of the wire 3012 or 3022. For example, when the equivalent resistance is 100 ohms, an owned resistance of a first wire is 98 ohms and an owned resistance of a second wire is 99 ohms, the resistance of the first resistor corresponding to the first wire is 2 ohms, and the resistance of the first resistor corresponding to the second wire is 1 ohm.

When the touch panel detects there is a touch point is touched by scanning, the controller 303 scans all the touch electrodes 3011 and 3021, a charging voltage charges a mutual-capacitance or a self-capacitance formed by each touch electrode 3011, 3021 to be a rated voltage through the serially connected wire and first resistor, because the equivalent resistances of all the wires are equal to one another, during the controller 303 charges all the transversal electrode arrays 301 and longitudinal electrode arrays 302, voltage-divided values of all the wires are equal, which would not affect the charging times of the mutual-capacitances or the self-capacitances formed by the touch electrodes 3011, 3021. Moreover, by measuring each of the charging times, the position of the touched point can be accurately determined and the detection accuracy of the touch panel is significantly improved.

Figure 4:
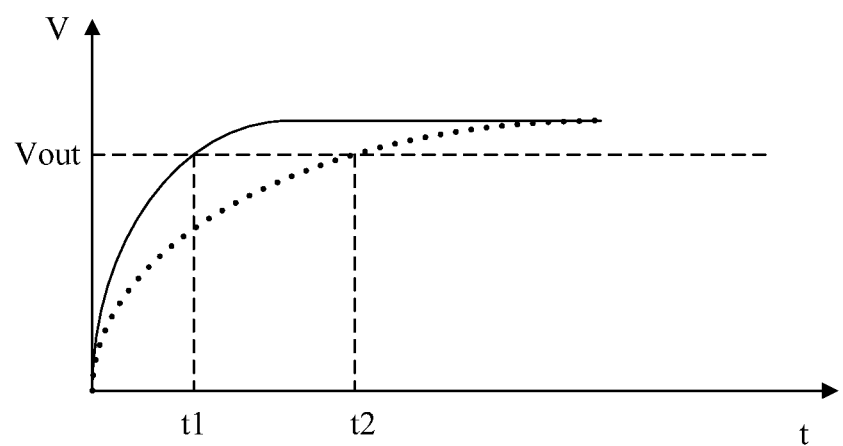
FIG. 4 is a schematic view of a charging curve of an embodiment of the touch panel in FIG. 3.

Furthermore, as shown in FIG. 4, the horizontal axis represents a charging time of capacitance, and the vertical axis represents a charging voltage. Taking that the self-capacitance or the mutual-capacitance of touch panel would be increased after being touched as an example for the purpose of description, the solid curve represents a charging curve before being touched, the dashed curve represents a charging curve after a touch point is touched, when a capacitance is charged to the rated voltage value Vout regardless of before or after being touched, the charging time before being touched is t1, and the charging time after the touched point is touched is t2, because the capacitance after being touched is increased, the charging time correspondingly is changed. Moreover, because the other touch electrodes are not touched and correspondingly the capacitances thereof are equal, and therefore corresponding charging times t1 also are equal. Accordingly, a touch point corresponding to the self-capacitance or mutual-capacitance with the charging time t2 is determined as the current touched position.

In a preferred embodiment, in order to save the space of the touch panel and reduce the error, the first resistor serially connected with each wire is a surface mounted device (SMD) resistor. In other embodiment, the first resistor may be other type resistor according to the need and is not limited herein.

In another preferred embodiment, in order to make the detection accuracy of the touch panel to be more accurate, first spacings among the transversal electrode arrays 301 are equal, i.e., generally a first spacing between each neighboring ones of the transversal electrode arrays 301 is equal to that between other neighboring ones of the transversal electrode arrays 301. Likewise, second spacings among the longitudinal electrode arrays 302 are equal, i.e., generally a second spacing between each neighboring ones of the longitudinal electrode arrays 302 is equal to that between other neighboring ones of the longitudinal electrode arrays 302. In other embodiment, it may give other settings for the first spacings and the second spacings according to the need and is not limited herein.

Different from the prior art, the touch panel of the invention includes transversal electrode arrays and longitudinal electrode arrays with mutually perpendicular extending directions, the transversal electrode arrays and the longitudinal electrode arrays are each connected to a controller by serially connecting with a wire, all the wires are each further serially connected with a first resistor, a sum of an owned resistance of each wire and a resistance of the first resistor serially connected with the wire constitutes an equivalent resistance, and all the equivalent resistances respectively corresponding to all the wires are equal, so that when the touch panel has received a touch operation, the controller can accurately determined the touched position, the problem of inaccurate detection caused by an error resulting from different wire resistances can be avoided, and the detection accuracy of the touch panel is effectively improved.

Figure 5:
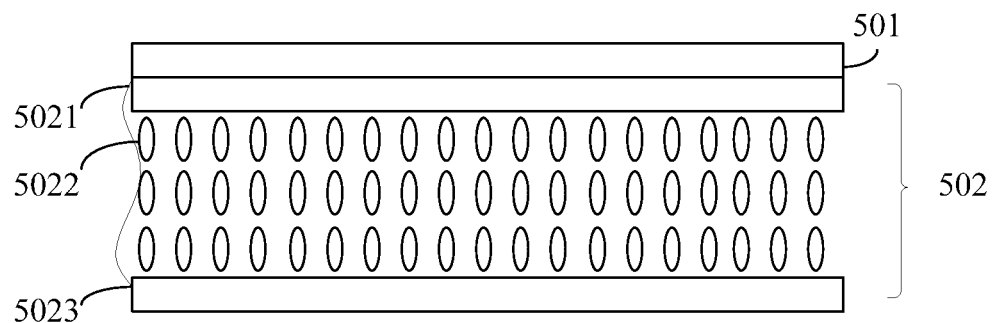
FIG. 5 is a schematic structural view of an embodiment of a touch-sensitive display device of the invention.

Referring to FIG. 5, FIG. 5 is a schematic structural view of an embodiment of a touch-sensitive display device of the invention. In this embodiment, the touch-sensitive display device includes a touch panel 501 and a liquid crystal assembly 502. The liquid crystal assembly 502 includes a first substrate 5021, a second substrate 5023 and liquid crystal molecules 5022 disposed between the first substrate 5021 and the second substrate 5023. It should be noted that, the relationship between the touch panel 501 and the liquid crystal assembly 502 in FIG. 5 only is a relative relationship, for different types of touch-sensitive display devices, they may have different positional relationship, and thus the above relationship is illustrative and not limiting.

Figure 6:
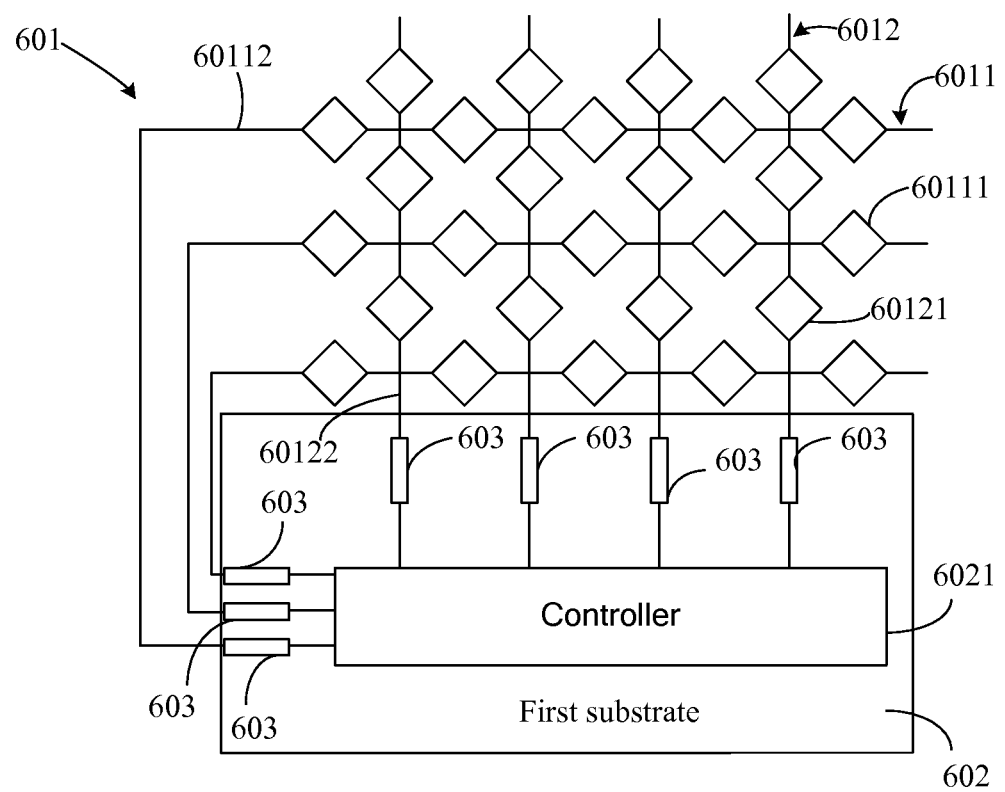
FIG. 6 is a schematic structural view of a specific embodiment of the touch-sensitive display device in FIG. 5.

Moreover, as shown in FIG. 6, FIG. 6 is a schematic structural view of a specific embodiment of the touch-sensitive display device.

In this embodiment, the touch-sensitive display device includes a touch panel 601. The touch panel 601 includes transversal electrode arrays 6011 and longitudinal electrode arrays 6012. An extending direction of the transversal electrode arrays 6011 and an extending direction of the longitudinal electrode arrays 6012 are mutually perpendicular to each other. A first substrate 601 of a liquid crystal assembly includes a controller 6021. Each of the transversal electrode arrays 6011 includes at least two touch electrodes 60111, and each of the longitudinal electrode arrays 6012 includes at least two touch electrodes 60121. The touch electrodes 60111 and 60121 are nanometer ITO (indium tin oxide) electrodes, and in other embodiment, they may be other type electrodes and are not limited herein. Each of the transversal electrode arrays 6011 is connected to the controller 6021 by a wire 60112, and each of the longitudinal electrode arrays 6012 is connected to the controller 6021 by a wire 60122. In order to ensure equivalent resistances of the wires 60112 and the wires 60122 respectively connecting with touch electrodes 60111 and the touch electrodes 60121 to be equal with one another, all the wires 60112 and 60122 are each serially connected with a first resistor 603 corresponding to its owned resistance of the wire.

Specifically, in this embodiment, the touch panel 601 is a capacitive touch panel which is a self-capacitance touch panel or a mutual-capacitance touch panel. An operation principle of the capacitive touch panel is that when the user touches the touch panel, it would change an existing capacitance of the capacitive touch panel, e.g., a self-capacitance formed by each touch electrode 60111 or 60121 in the self-capacitance touch panel together with the ground, or a mutual-capacitance mutually formed by each transversal touch electrode 60111 and each longitudinal touch electrode 60121 at the intersection of the transversal electrode array 6011 and the longitudinal electrode array 6012 in the mutual-capacitance touch panel. By detecting position coordinates of touch electrodes which have a capacitance change (s) caused by the finger's touch of user, the touch panel can determine the touched position consequently.

In this embodiment, the position of the touched point is determined by measuring times of charging all touch electrodes 60111 and 60121 to a rated voltage value, taking the self-capacitance touch panel as an example, it is assumed that a charging voltage for charging the touch electrodes 60111 and 60121 is Vin, all the capacitances are required to be charged to a rated voltage value Vout, the self-capacitances formed by respective touch electrodes with the ground each are C, the equivalent resistances of wires each are R, according to a formula Vout=Vin $(1-e^{-t/RC})$ associated with the rated voltage Vout and a charging time t of being charged to the rated voltage, it can be found that as long as the rated charging voltage Vin, the equivalent resistances R of all the wires 60112, 60122 being equal and the values C of all the capacitances being equal are ensured, corresponding times can be accurately determined and thereby the position of a touched point can be determined as a result.

In this embodiment, in order to make the equivalent resistances of all the wires 60112, 60122 to be equal, a resistance of each of the wires 60112, 60122 is firstly measured.

Specifically, according to a wire resistance calculation formula R=(ρL)/S, a resistance of each of the wires 60112, 60122 can be obtained by calculation. In the formula, ρ is a resistivity of the wire, L is a length of the wire and concretely is a length of the wire connecting the touch electrode 60111 or 60121 to the controller 303, and S is a cross-sectional area of the wire. In a preferred embodiment, the wires respectively connecting the transversal electrodes and longitudinal electrodes are made of a same material and have a same cross-sectional size, a resistance of each wire can be obtained directly by measuring the length of the wire, and therefore the measuring process can be simplified. In other embodiment, the wires may be made of different materials and have different cross-sectional sizes and are not limited herein, as long as the equivalent resistances being equal is ensured.

After the resistance of each wire 60112 or 60122 is obtained by measurement and calculation, equivalent resistances of all the wires 60112, 60122 are determined, and then a resistance of a first resistor 603 serially connected with each wire 60112 or 60122 can be determined based on a difference between the equivalent resistance and an owned resistance of the wire 60112 or 60122. For example, when the equivalent resistance is 100 ohms, an owned resistance of a first wire is 98 ohms and an owned resistance of a second wire is 99 ohms, the resistance of the first resistor corresponding to the first wire is 2 ohms, and the resistance of the first resistor corresponding to the second wire is 1 ohm.

When the touch panel detects there is a touch point is touched by scanning, the controller 6021 scans all the touch electrodes 60111 and 60121, a charging voltage charges a mutual-capacitance or a self-capacitance formed by each touch electrode 60111, 60121 to be a rated voltage through the serially connected wire and first resistor, because the equivalent resistances of all the wires are equal to one another, during the controller 6021 charges all the transversal electrode arrays 6011 and longitudinal electrode arrays 6012, voltage-divided values of all the wires are equal, which would not affect the charging times of the mutual-capacitances or the self-capacitances formed by the touch electrodes 60111, 60121. Moreover, by measuring each of the charging times, the position of the touched point can be accurately determined and the detection accuracy of the touch panel is significantly improved.

In a preferred embodiment, in order to save the space of the touch panel and reduce the error, the first resistor serially connected with each wire is a surface mounted device (SMD) resistor. In other embodiment, the first resistor may be other type resistor according to the need and is not limited herein.

In another preferred embodiment, in order to make the detection accuracy of the touch panel to be more accurate, first spacings among the transversal electrode arrays 6011 are equal, i.e., generally a first spacing between each neighboring ones of the transversal electrode arrays 6011 is equal to that between other neighboring ones of the transversal electrode arrays 6011. Likewise, second spacings among the longitudinal electrode arrays 6012 are equal, i.e., generally a second spacing between each neighboring ones of the longitudinal electrode arrays 6012 is equal to that between other neighboring ones of the longitudinal electrode arrays 6012. In other embodiment, it may give other settings for the first spacings and the second spacings according to the need and is not limited herein.

Different from the prior art, the touch-sensitive display device of the invention includes a touch panel, the touch panel includes transversal electrode arrays and longitudinal electrode arrays with mutually perpendicular extending directions, the transversal electrode arrays and the longitudinal electrode arrays are each connected to a controller by serially connecting with a wire, all the wires are each further serially connected with a first resistor, a sum of an owned resistance of each wire and a resistance of the first resistor serially connected with the wire constitutes an equivalent resistance, and all the equivalent resistances respectively corresponding to all the wires are equal, so that when the touch panel has received a touch operation, the controller can accurately determined the touched position, the problem of inaccurate detection caused by an error resulting from different wire resistances can be avoided, and the detection accuracy of the touch panel is effectively improved.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touch panel comprising transversal electrode arrays and longitudinal electrode arrays with mutually perpendicular extending directions, and the transversal electrode arrays and the longitudinal electrode arrays being each connected to a controller by a wire; wherein all the wires have different owned resistances and are each serially connected with a first resistor and whereby all the first resistors have different resistances and are each connected between the controller and a corresponding one of the transversal electrode arrays and the longitudinal electrode arrays respectively connected with all the wires, a sum of the owned resistance of each of the wires and the resistance of the first resistor serially connected with the wire constitutes an equivalent resistance, and all the equivalent resistances respectively corresponding to all the wires are equal;

the transversal electrode arrays are each a first one-dimensional array and have equal first spacings among the first one-dimensional arrays, and the longitudinal electrode arrays are each a second one-dimensional array and have equal second spacings among the second one-dimensional arrays;

the transversal electrode arrays and the longitudinal electrode arrays each comprise at least two serially-connected nanometer indium tin oxide (ITO) electrodes.

2. The touch panel as claimed in claim 1, wherein the first resistor is a surface mounted device (SMD) resistor.

3. The touch panel as claimed in claim 1, wherein the touch panel is a self-capacitance touch panel or a mutual-capacitance touch panel.

4. A touch panel comprising transversal electrode arrays and longitudinal electrode arrays with mutually perpendicular extending directions, the transversal electrode arrays and the longitudinal electrode arrays being each connected to a controller by a wire, all the wires having different owned resistances and being each serially connected with a first resistor and whereby all the first resistors having different resistances and being each connected between the controller and a corresponding one of the transversal electrode arrays and the longitudinal electrode arrays respectively connected with all the wires, a sum of the owned resistance of the wire and the resistance of the first resistor serially connected with the wire constituting an equivalent resistance, and all the equivalent resistances respectively corresponding to all the wires being equal.

5. The touch panel as claimed in claim 4, wherein the transversal electrode arrays are each a first one-dimensional array, a first spacing between each neighboring two of the first one-dimensional arrays is equal to that between other neighboring two of the first one-dimensional arrays, and the longitudinal electrode arrays are each a second one-dimensional array, a second spacing between each neighboring two of the second one-dimensional arrays is equal to that between other neighboring two of the second one-dimensional arrays.

6. The touch panel as claimed in claim 4, wherein the transversal electrode arrays and the longitudinal electrode arrays each comprise at least two nanometer indium tin oxide (ITO) electrodes.

7. The touch panel as claimed in claim 4, wherein the first resistor is a surface mounted device (SMD) resistor.

8. The touch panel as claimed in claim 4, wherein the touch panel is one selected from the group consisting of a self-capacitance touch panel and a mutual-capacitance touch panel.

9. A touch-sensitive display device comprising a touch panel;

wherein the touch panel comprises transversal electrode arrays and longitudinal electrode arrays, an extending direction of the transversal electrode arrays and an extending direction of the longitudinal electrode arrays are mutually perpendicular to each other, the transversal electrode arrays and the longitudinal electrode arrays are each connected to a controller by a wire, all the wires have different owned resistances and are each serially connected with a first resistor and whereby all the first resistors have different resistances and are each connected between the controller and a corresponding one of the transversal electrode arrays and the longitudinal electrode arrays respectively connected with all the wires, a sum of the owned resistance of each of all the wires and the resistance of the first resistor serially connected with the wire constitutes an equivalent resistance, and all the equivalent resistances respectively corresponding to all the wires are equal.

10. The touch-sensitive display device as claimed in claim 9, wherein the transversal electrode arrays are each a first one-dimensional array and first spacings among the first one-dimensional arrays are equal, the longitudinal electrode arrays are each a second one-dimensional array and second spacings among the second one-dimensional arrays are equal.

11. The touch-sensitive display device as claimed in claim 9, wherein the transversal electrode arrays and the longitudinal electrode arrays each comprise at least two nanometer indium tin oxide (ITO) electrodes.

12. The touch-sensitive display device as claimed in claim 9, wherein the first resistor is a surface mounted device (SMD) resistor.

13. The touch-sensitive display device as claimed in claim 9, wherein the touch panel is a self-capacitance touch panel or a mutual-capacitance touch panel.

* * * * *